United States Patent Office 3,556,852
Patented Jan. 19, 1971

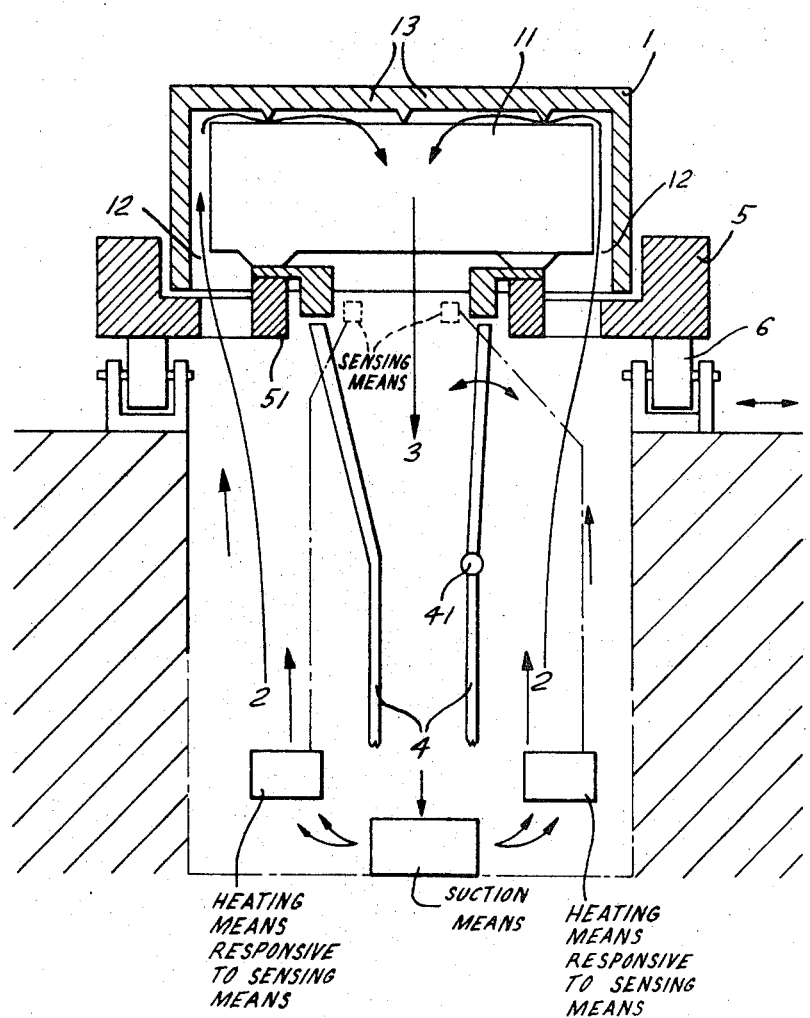

3,556,852
METHOD AND APPARATUS FOR TREATING STORAGE BATTERY PLATE ASSEMBLY
Herbert Haebler, Frankfurt am Main, and Heinz Hense, Wuppertal-Elberfeld, Germany, assignors to Varta Aktiengesellschaft, Frankfurt am Main, Germany
Filed May 16, 1968, Ser. No. 729,809
Claims priority, application Germany, June 22, 1967,
V 33,914
Int. Cl. H01m 35/26, 35/18
U.S. Cl. 136—33                                    17 Claims

ABSTRACT OF THE DISCLOSURE

A method and an apparatus for producing a storage battery provide for assembling the electrode plates and separators in an open-sided housing. The plates are wetted with a protective agent. Thereupon the housing with the assembled plates therein is advanced in a predetermined path and during this movement a heated gas is blown into the housing through the open side thereof and is withdrawn through the spaces between the plates, whereby the latter are dried.

BACKGROUND OF THE INVENTION

The present invention relates generally to storage batteries, and more particularly to a method of and an arrangement for producing such storage batteries.

Until comparatively recently it was customary to produce storage batteries or electric accumulators by the so-called "tank-formation" method, wherein the battery was stored in dry condition and maintained in this manner until it was to be used. Now, however, the trend in manufacturing is more and more towards using the so-called "case-formation" method in which the electrode plates and separators are fully assembled within the housing and the battery is filled with electrolyte and charged. This, however, requires that such a battery undergo maintenance service during its shelf life that is that it be recharged from time to time while it is stored preliminary to sale because over a period of time the accumulator loses some of its capacity by self-discharge.

In view of the fact that this is obviously undesirable and constitutes a disadvantage as compared with the aforementioned tank-formation type batteries which can be stored in dry condition, attempts have been made to obtain similarly dry-storable but already filled and charged batteries manufactured according to the case-formation method. This, however requires that the plates be impregnated with a protective agent, for example boric acid. While this is possible in principle one important problem relating to this approach has never been properly solved, namely how to dry the sets or blocks of electrode plates in the battery housing once they have been impregnated with the protective agent.

It is thus a general object of the present invention to overcome this problem.

More particularly it is an object of the present invention to provide a method and an arrangement for this purpose.

SUMMARY OF THE INVENTION

In accordance with one feature of our invention we provide a method of treating a storage battery including an assembly consisting of electrode plates and separator plates arranged in parallel relationship and wetted with a protective agent, and a housing having an open side and accommodating said assembly with clearance, comprising the steps of blowing a gas at elevated temperature through said open side into said clearance, and effecting withdrawal of the thus admitted gas at the open side, whereby to circulate the gas around such plates during withdrawal and drying the plates by contact with the gas.

It will be appreciated that this method is highly advantageous and provides significant advantages over what is already known in this field, when it is considered that heretofore the electrode plates were treated with a protective agent and where then individually passed through a tunnel-type drier to be dried therein. Only subsequently was it possible to assemble the electrode plates in the housing. Other approaches have provided for drying the electrode plates in a vacuum or in a protective gaseous atmosphere. Again, however, each of these methods the electrode plates had to be treated individually and could be assembled in the housing and into the electrode block only subsequently. While these methods did provide a dry-charged storable accumulator, they nevertheless were unable to achieve their purpose by resorting to the economical case-formation approach and necessarily had to depend on the tedious and expensive tank-formation or tank processing method.

By contrast, the present invention provides for highly accelerated production because it utilizes a gas in heated state, for instance air which may be blown over the electrode plates in the housing at considerable speed and which effects intensive drying of the electrode plates as well as the separators in a very short time.

The novel features which are considered as characteristic for the invention are set forth in particular in the appended claims. The invention itself, however, both as to its construction and its method of operation, together with additional objects and advantages thereof, will be best understood from the following detailed description of specific embodiments when read in connection with the accompanying drawing.

BRIEF DESCRIPTION OF THE DRAWING

The single figure is a somewhat diagrammatic representation of an arrangement embodying the invention.

DESCRIPTION OF THE PREFERRED EMBODIMENTS

Discussing now the drawing in detail, it will be seen that a storage battery case 1 has assembled therewithin the plate sets 11, consisting of the electrode plates and the separators therefor. The case 1 has an open side, preferably the side of largest cross-sectional area, and advantageously the side confronting the cell-fronts 12.

The drawing shows that the plate sets 11 are accommodated with clearance in the housing 1 and that a stream of heated gas, for instance hot air 2 which is blown through the open side into the interior of the housing 1, impinges against the bottom wall 13 of the housing and thereby is reversed in its direction. This causes the stream of hot air to pass through the plate sets 11, that is through the spaces between the individual plates and separators of the sets 11, and to thereupon issue from the housing 1 at the open side thereof, that is at the cell fronts 12. The spent hot air can then be suitably withdrawn for instance by suitable suction means. This is indicated by the arrow 3 which shows passage of the air through the spacing between the plates of the sets 11 and out of the open side 12.

If batteries are to be treated individually, that is one battery after another in a discontinuously operating arrangement, the stream of hot air 2 can be supplied by blowing nozzles which preferably have elongated outlets formed in correspondence with the elongation of the housing 1. A suitable suction nozzle 4 here indicated as being of funnel-shaped configuration is arranged adjacent the open side 12 for withdrawing the spent air in the direction indicated by the arrow 3.

The drawing shows an arrangement which permits continuous drying operations, rather than discontinuous operations. In this case, the supply nozzle or nozzles for supplying the hot air stream 2 will be seen to be constituted by the walls of the support means for the arrangement and by the walls of the suction funnel 4 which define with the walls of the support means the nozzle or nozzles 2. In the illustrated embodiment we have provided a conveyor schematically illustrated in form of transversely spaced sprocket chains 5 which are suitably supported on conveying rollers 6 and may be composed of articulated links. The construction of this conveyor is already known in the art and is not believed to require detailed discussion.

The use of the two transversely spaced sprocket chains 5 leaves the electrode sets 11 and the pole bridges thereof, without support. This is not true of course if the housing 1 is positioned with its open side in upward direction but it will be understood that the illustrated position, wherein the open side faces downwardly, is the most favorable one for the drying process and for the movement of the air stream. Of course in this position it is then necessary to provide support for the electrode sets 11 and the associated pole bridges and for this purpose the sprocket chains are provided, with supporting elements 51. This, of course, is only exemplary and any other preferred arrangement may be provided for instance by arranging springs, rollers or similar elements so that they will bear upon the electrode sets 11.

Arrangements of this type must be usable for different types and sizes of batteries, it being evident that 6 volt batteries, for example are smaller than 12 volt batteries as a rule. It is therefore necessary to be able to compensate for such different sizes and as a result we prefer to provide for adjustment in the spacing between the sprocket chains 5. While we have not specifically illustrated the means for this purpose, such means being well known in the art, we have schematically indicated the possibility of movement of at least one of the sprocket chains 5 with reference to the other by the double-headed arrow which is to be found in the drawing. Similarly, it is also advantageous that the suction funnel 4 may be made adjustable so as to accommodate it to adjustments in the spaces between the sprocket chains. For this reason, at least one of the walls which define between themselves the funnel 4, and advantageously two opposite walls, may be provided of two sections which are hingedly joined as indicated at 41. This possibility of pivotable adjustment is indicated by the curved double-headed arrow shown in the drawing.

The air used for producing the air stream 2 must of course be suitably heated, and for this purpose we have diagrammatically illustrated a heating means. The drying temperature is primarily governed by the consideration that neither the separators nor the electrode plates of the sets 11 must be harmed. For this reason, the drying temperature is preferably in the range between approximately 130° and 150° C. In an arrangement such as the one illustrated where each of the various housings and contents thereof which are supported on the conveying arrangement must traverse an elongated path from an upstream end to a downstream end that is from the point where they enter the conveyor to the point where they leave the conveyor or at least where the drying process is completed, it is advantageous that the heat of the air stream 2 be highest at the beginning of the drying process and that it gradually decrease in downstream direction of the path through which the housings move. It is clear, of course, that a plurality of heating elements can be provided whose heating capacity differs, that is the heating capacity of the elements located adjacent the upstream end of the path is greater than that of the elements located downstream of the upstream end. This of course is an expedient well known and requires no elaboration.

It will be appreciated that the arrangement herein disclosed is particularly suitable for continuous operation with automatic control of the drying temperature. For this purpose thermal sensing elements, or humidity sensing elements may be provided for sensing the temperature and/or humidity of the electrode sets, and the temperature sensed or the humidity detected, being a measure for the extent to which drying has been effected. The indications thus derived may be supplied by means of an operative connection to the heating elements, and all of this is well known in the art. To provide for continuous control of the drying process during advancement of the batteries through the arrangement a plurality of such sensing devices, thermal sensors, humidity sensors or both, may be arranged longitudinally spaced from one another so as to provide indications of the state of readiness at various different locations spaced along the conveyor.

The arrangement herein described may utilize heated air which has been accelerated to very high speeds and this assures that only relatively low drying times are required even though it is necessary to dry the entire tightly compressed electrode set, rather than individual plates as was heretofore the case. This is of particular advantage as is the fact that treatment of the plates with a protective agent as boric acid, as well as the formation and subsequently the drying of the plates can be completed directly in the housing without any necessity for removing the cells. It should also be mentioned that it is advantageous, after the electrode sets have undergone several impregnations with the protective agent and have gone through the drying process to provide the separators with a wetting agent to improve or guarantee their wettability.

It will be understood that each of the elements described above, or two or more together, may also find a useful application in other types of arrangements differing from the types described above.

While the invention has been illustrated and described as embodied in a method and an arrangement for treating of storage batteries, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the specific or generic aspects of this invention and, therefore, such adaptations should and are intended to be comprehended within the meaning and range of equivalence of the following claims.

What is claimed as new and desired to be protected by Letters Patent is set forth in the appended claims:

1. In a method of treating a storage battery, the steps of forming an assembly from electrode plates and separator plates arranged in parallel relationship accommodating said assembly in a battery housing which has an open side and defines with said assembly a clearance; forming said electrode plates in said battery housing; contacting said assembly with a protective agent whereby the assembly is wetted; blowing air at elevated temperature through said open side into said clearance; and effecting withdrawal of the thus admitted air at said open side, whereby to circulate the air around such plates contacted with said protective agent for drying them by contact with the circulating air, said assembly being treated with said protective agent and dried while accommodated in said battery housing without further handling exteriorly of said battery housing.

2. A method as defined in claim 1, wherein the steps of blowing said air into and withdrawing it from said housing are carried out continuously.

3. A method as defined in claim 1, wherein the steps of blowing said air into and withdrawing it from said housing are carried out contemporaneously.

4. An arrangement for carring out the method of claim 1, comprising, in combination, first means for advancing said housing with said assembly therein as a unit in a predetermined path; second means for blowing air at elevated temperature through said open side of said housing into said clearance; and third means for effecting withdrawal of the thus admitted air at said open side to thereby circulate the air around the plates and dry the same by contact with the air.

5. An arrangement as defined in claim 4, wherein said first means comprises a conveyor arranged to support and advance said housing and assembly in said predetermined path.

6. An arrangement as defined in claim 5, wherein said second means comprises blowing nozzle means arranged along said predetermined path adjacent thereto and being positioned to blow said air into said open side of said housing during advancing thereof in said path.

7. An arrangement as defined in claim 6, wherein said blowing nozzle means comprises at least one elongated outlet extending along said path.

8. An arrangement as defined in claim 6, wherein said blowing nozzle means is arranged adjacent to one side of said conveyor.

9. An arrangement as defined in claim 5, wherein said conveyor comprises a plurality of articulated links, and roller means positioned for rollingly supporting said links.

10. An arrangement as defined in claim 9, wherein said conveyor comprises a pair of transversely spaced chain members each composed of a plurality of said articulated links, said housing being supported by said chain members at said open side and at transversely spaced locations, and further comprising support means arranged to support said assembly at said open side intermediate said chain members.

11. An arrangement as defined in claim 9, wherein said conveyor comprises a pair of transversely spaced chain members each composed of a plurality of said articulated links; and further comprising means for varying the transverse spacing of said chain members.

12. An arrangement as defined in claim 6, wherein said third means comprises suction nozzle means arranged at one side of said path and therealong.

13. An arrangement as defined in claim 12, said suction nozzle means having an inlet; and further comprising means for varying the cross-sectional area of said inlet.

14. An arrangement as defined in claim 13, said suction nozzle means comprising a plurality of wall portions defining with one another said inlet, and wherein said means for varying the cross-sectional area of said inlet comprises mounting means mounting at least one of said wall portions for tilting movement with reference to the others.

15. An arrangement as defined in claim 6, wherein said path has an upstream portion and a downstream portion; and further comprising heating means arranged for supplying to the blowing nozzle means in the region of said upstream portion air heated to a predetermined temperature, and for supplying to the blowing nozzle means in the region of said downstream portion air heated to temperatures which are lower than said predetermined temperature.

16. An arrangement as defined in claim 4, wherein said path has an upstream end; and further comprising sensing means arranged downstream of said upstream end and operative for sensing the extent to which said plates have been treated.

17. An arrangement as defined in claim 16; and further comprising an operative connection between said sensing means and said heating means for controlling operation of the latter in response to indications provided by the former.

References Cited

UNITED STATES PATENTS

| | | | |
|---|---|---|---|
| 2,149,812 | 3/1939 | Lindstrom | 136—33 |
| 2,300,628 | 11/1942 | Merson | 136—33X |
| 2,656,399 | 10/1953 | Hindall et al. | 136—33 |
| 2,887,522 | 5/1959 | Mackenzie | 136—33 |
| 2,911,457 | 11/1959 | Sabatino et al. | 136—33 |
| 2,978,528 | 4/1961 | Heap | 136—33 |
| 3,038,018 | 6/1962 | Tiegel | 136—33 |
| 3,054,607 | 9/1962 | Hoyt et al. | 263—36 |
| 3,328,893 | 7/1967 | Schilling | 34—27 |
| 3,366,511 | 1/1968 | Rousey | 136—170 |
| 3,189,484 | 6/1965 | Sundman | 136—33 |
| 2,747,008 | 5/1956 | Sundberg et al. | |

ALLEN B. CURTIS, Primary Examiner

A. SKAPARS, Assistant Examiner

U.S. Cl. X.R.

34—22; 136—78